United States Patent [19]

Renaud

[11] Patent Number: 4,777,761
[45] Date of Patent: Oct. 18, 1988

[54] BROKEN BILL FISHING PLUG

[76] Inventor: Ronnie C. Renaud, Rte. 1, Liberty, S.C. 29657

[21] Appl. No.: 79,349

[22] Filed: Jul. 30, 1987

[51] Int. Cl.⁴ .............................................. A01K 85/00
[52] U.S. Cl. .................................. 43/42.47; 43/42.03; 43/42.48
[58] Field of Search ................ 43/42.47, 42.03, 42.22, 43/42.48

[56] References Cited

U.S. PATENT DOCUMENTS

| | | | |
|---|---|---|---|
| 2,775,839 | 1/1957 | Kuslich | 43/42.47 |
| 2,984,928 | 5/1961 | Jenkins | 43/42.15 |
| 3,279,117 | 10/1966 | Weimer | 43/42.47 |
| 3,367,057 | 2/1968 | Pond | 43/42.47 |
| 4,445,294 | 5/1984 | Gowing | 43/42.47 |
| 4,573,282 | 3/1986 | Rowe | 43/42.15 |

Primary Examiner—Gene P. Crosby
Attorney, Agent, or Firm—Cort Flint

[57] ABSTRACT

An artificial fishing bait (A, B) includes a broken bill (18, 18') connected to a body (10, 40) by a pivot (29, 18a and 48, 46) enhanced by a lateral slot (16). A spoon (22) of the bill may be weighted at (24) for deeper diving. Plug (A) has a loose omnidirectional pivot (29, 18a) which facilitates natural wobbling of the artificial bait when weighted for depths of 40 feet or more. Shank (30) may be reduced relative to slot (16) and bill opening (18a) made considerably larger than pivot pin 29 facilitating omnidirectional pivoting for plug (A). Plug (B) has a lateral pivot (46, 48) which exhibits side-to-side diversions (52, 56) produced by lateral pivoting only. The amplitudes (52a, 56a) may be reduced to more closely simulate the darting path of bait fish when the spoon (22) is limited by a removable stop peg (50).

16 Claims, 4 Drawing Sheets

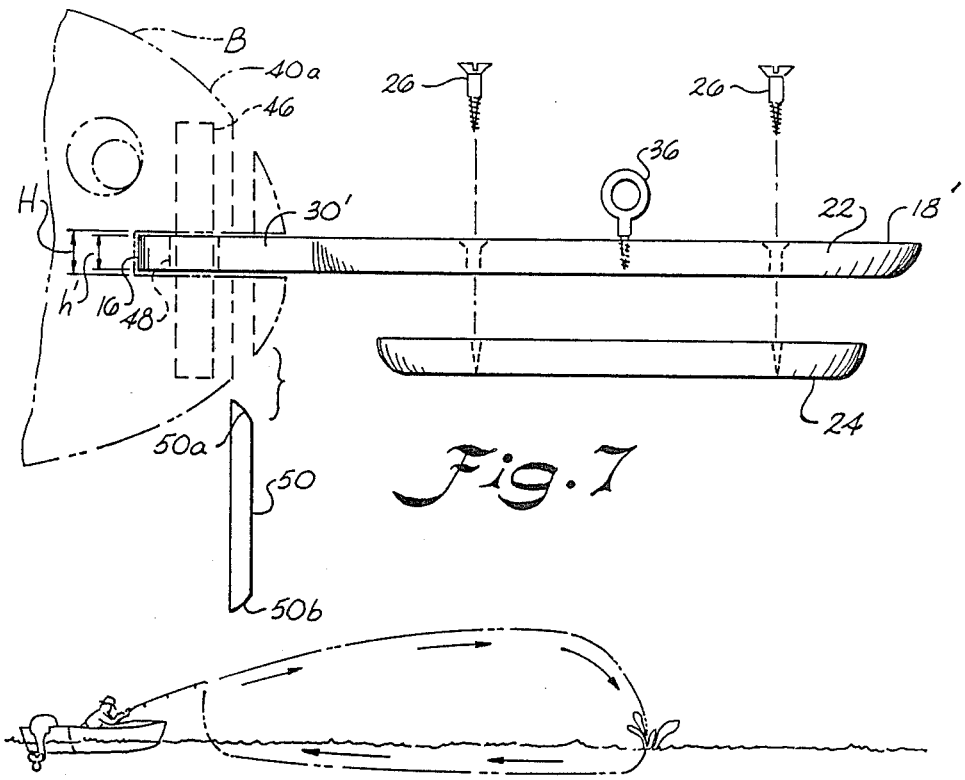
Fig. 7
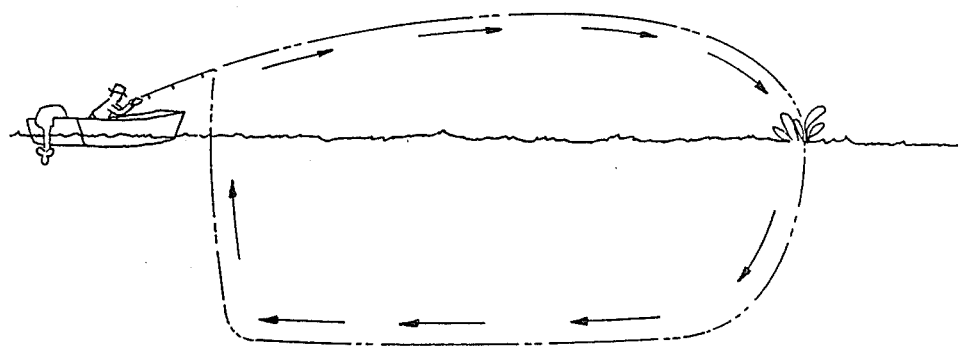
Fig. 8 PRIOR ART
Fig. 9

BROKEN BILL FISHING PLUG

BACKGROUND OF THE INVENTION

With increased popularity in sport and contest fishing, the demand for more diverse fishing plugs has developed. There has been a need for fishing plugs which will dive deeper in the water attracting the larger fish feeding at the lower lake levels. While weight and other devices have been added to the bill or spoon of fishing plugs, there appears to be a limit on the amount of weight that can be added. If too much weight is added, wobbling action of the fishing plug is considerably reduced. This reduced wobbling action results in a less effective artificial fish bait. The typical spoon bill fishing plug will dive only 10 feet or so with a normal retrieve. If the retrieve is made faster, the plug takes on an unnatural appearance. There is considerable need for a fishing plug that will dive 20 to 40 feet and not lose its action and bait fish appearance.

Accordingly, an important object of the invention is to provide a fishing plug which will dive deeper into the water upon the normal retrieve, yet retain its natural action.

Another object of the invention is to provide a deep diving fishing plug which may be adjusted for different diving depths.

Another object of the invention is to provide a deep diving fishing plug which may be programmed to have erratic lateral paths simulating that of a darting fish.

SUMMARY OF THE INVENTION

The above objectives are accomplished according to the present invention by providing a spoon bill which is separated from the body of the fishing plug. The bill may be attached to the plug by a loose omnidirectional pivot. This enables weight to be aded to the bill for deeper diving. Since there is a loose pivot connection between the bill and the body, the natural wobbling action of the fishing plug is not reduced. In another embodiment, the omnidirectional pivot may be replaced with a lateral pivot and a stop pin. The stop pin may be inserted into the plug to limit the lateral movement of the broken pivotal bill. This causes the plug to exhibit an erratic lateral path resembling that of a darting or wounded fish.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 7 is a side elevation of a broken bill fishing plug according to the invention having a pivot connecting the bill and plug body;

FIG. 8 is a schematic diagram of the retrieval of a prior art fishing plug;

FIG. 9 is a schematic diagram of the retrieval path of a weighted broken bill fishing plug constructed according to the invention;

DESCRIPTION OF A PREFERRED EMBODIMENT

Figure 1:
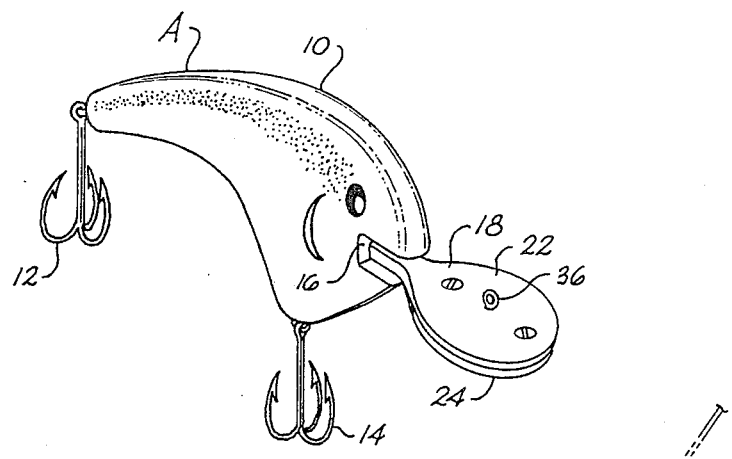
FIG. 1 is a perspective view illustrating a fishing plug having a broken spoon bill according to the invention.
Figure 2:
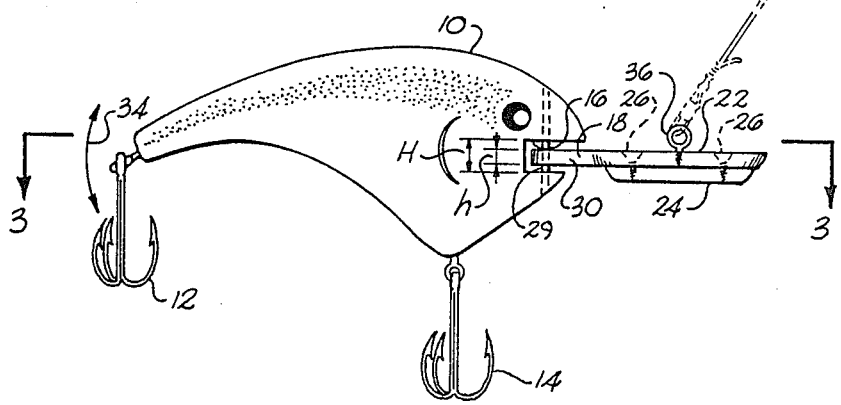
FIG. 2 is a side elevation of a broken bill fishing plug constructed in accordance with the present invention.

Referring now to the drawings, as can best be seen in FIGS. 1 and 2 a broken bill fishing plug A includes a fishing plug body 10 having a pair of conventional treble hooks 12 and 14. In a forward portion 10a of the body there is a lateral slot 16 formed across the entire front portion. The slot is open on the sides and the front of body 10. The opening is continuous. There is a broken bill 18 pivotally fixed with slot opening 16 by means of a pivot pin 20. Broken bill 18 consists of an enlarged spoon 22. Additional lead weight 24 may be attached to the bill spoon as desired for diving. The amount of weight used at 24 may be varied in order for the plug to dive to prescribed depths. So that different amounts of weights may be used, weight 24 may be attached to spoon 22 of bill 18 by conventional screw fasteners 26. An eyelet 28 connected to the bill provides for attachment to a conventional fishing line.

Referring now in more detail to the attachment of bill 18 to fish plug body 10, it can be see that a very loose omnidirectional pivot attachment is provided by a pivot pin 29 inserted through a larger diameter opening 18a of bill 18. Further, this loose pivot is provided by slot 16 being dimensioned to have a height "H" greater than the height "h" of a shank 30 of bill 18 received in slot 16. The omnidirectional pivot is provided by this loose pivot by means of which fishing plug body 10 may pivot and wobble in all directions relative to bill 18. Slot opening 16 also is unrestricted laterally for pivotal lateral movement of bill 18 in the slot opening. Fishing plug body 10 will wobble in a generally omnidirectional pattern that includes a lateral direction shown by arrow 32 and up and down vertical directions as shown by arrow 34. An eyelet is provided at 36 for attaching the fishing line.

Figure 10:
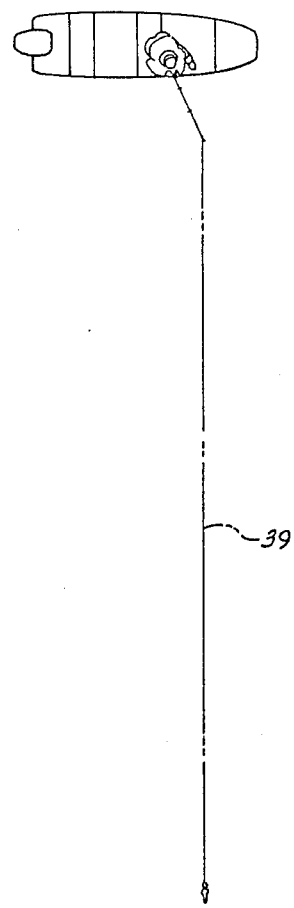
FIG. 10 is a schematic view of the side-to-side path of a broken bill fishing plug with a stop pin in accordance with the invention.

Preferrably, enough weight is added at 24 to take the spoon down to depths of 25 to 40 feet in a casting pattern according to FIG. 9. Of course, depths greater than 40 feet may be achieved by adding different weights 24. Normally this amount of weight would cause a fishing plug with a fixed bill to be retrieved straight through the water without any wobbling action. This natural wobbling action simulates that of a live bait fish. According to the invention, weighted bill 18 will be pulled generally straight through the water, as can be best seen in FIG. 10, but body 10 will wobble due to the loose pivotal connection between broken bill 18 and body 10. The loose pivotal connection of the broken bill will result in more wobbling action than the typical fixed bill fishing plug even without the weight. The fishing plug of the invention will run much deeper and with much more wobbling action.

Figure 3:
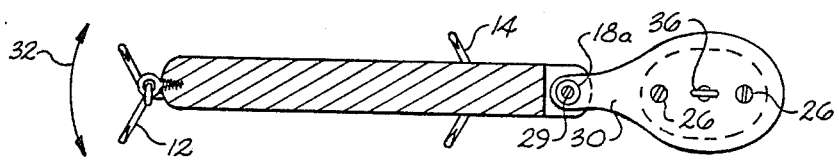
FIG. 3 is a sectional view taken along line 3—3 of FIG. 2.
Figure 4:
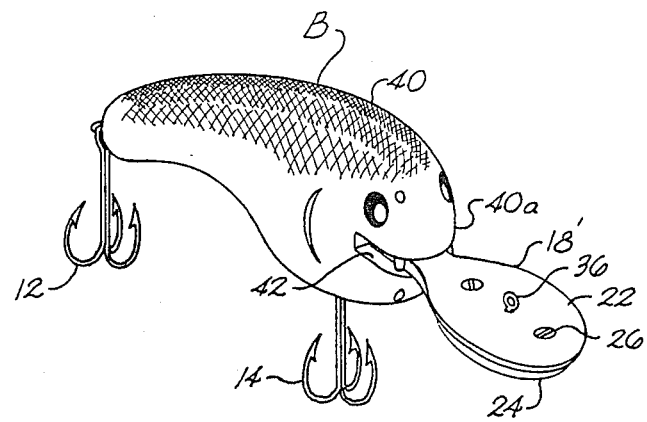
FIG. 4 is a perspective view of a broken spoon bill in accordance with the invention.
Figure 5:
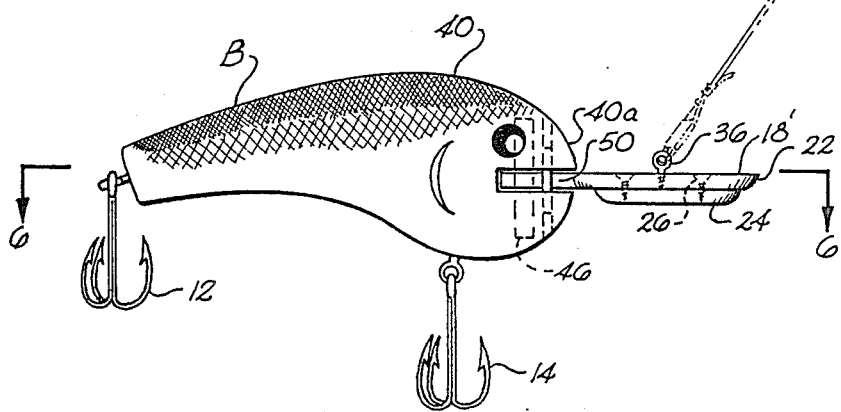
FIG. 5 is an elevation of a broken spoon bill with weight in accordance with the invention.
Figure 6:
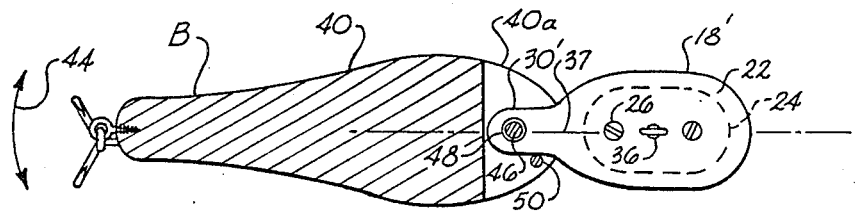
FIG. 6 is a sectional view taken along line 6—6 of FIG. 5.
Figure 11:
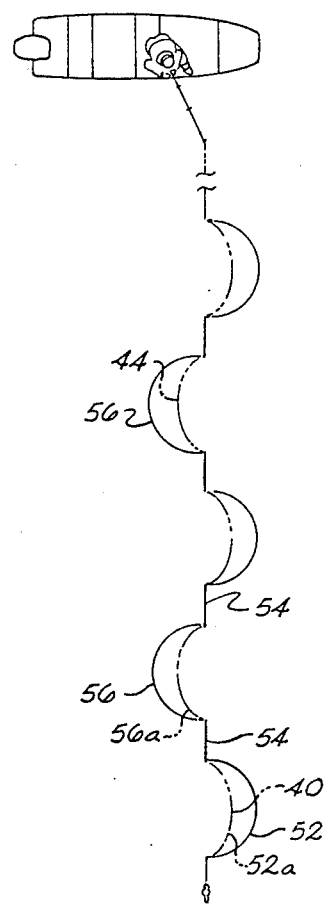
FIG. 11 is a schematic view illustrating the path of travel of a broken bill fishing plug constructed in accordance with the present invention.

Referring now to FIGS. 4–7, another embodiment of a broken bill fishing plug according to the invention will be described. A fishing plug B includes a fishing plug body 40 having a front portion 40a. A lateral slot 42 is cut in front portion 40a. Lateral slot 42 extends across the entire front portion from one side to the other. A lateral pivot for attaching broken bill 18' to plug body 40 is provided by a pivot pin 46 and a hole 48 formed in bill 18'. The dimensions between the height "h'" of slot 16 and the height of shank 30' of bill 18' is such that a snug fit is provided which will allow lateral movement between bill 18' and body 10. Generally, no vertical relative movement will be permitted between bill 18' and plug body 40. The loose omnidirectional pivot of the embodiment of FIGS. 1–3 is not present with only lateral pivoting in accordance with arrow 44 being present. Removable stop means for limiting the lateral movement of broken bill 18' in one direction only is provided by a removable stop peg 50. Quite unexpectedly, it has been found that fishing plug B will exhibit side-to-side darting paths. With peg 50 removed, the darting path will be approximately 2 feet to the side of a generally straight line. The plug will dart about 2 feet to one side, proceed straight for about 2 feet, and then dart to the left for about 2 feet. The darting pattern will then be repeated. This can best be seen in FIG. 11 where the right side darting path is indicated at 52, a generally straight portion at 54, and the left side darting path at 56. With removable peg 50 in place, it has been found, quite unexpectedly, that fishing plug B will dart to the left and right only about 4 inches for a 2 foot length. This is shown at 52a and 56a. The weighted features of broken bill 18' may be generally the same as that described for fishing plug A. The less attenuated darting motions produced with peg 50 in place are thought to more closely simulate that of the natural darting movement of the fish. Peg 50 extends vertically generally throughout the fishing plug body being contoured at 50a and 50b to conform to the outer curve surface of the fishing plug body 40. Weights 24 different sizes may be attached to spoon 22' of bill 18' for a desired fishing depth.

The invention results in an advantageous construction for a fishing plug. The plug may be made to dive deeper than conventional plugs. The heavy weight allows the plug to be thrown farther and dive deeper. The broken bill and loose pivotal attachment provides increased omnidirectional wobbling motions even with increased weight at deper depths. There is no loss of natural bait fish action. Erratic side to side darting motions may be provided with adjustments by the stop pin in place. All of these result in a very diversified fishing plug which can be used in a variety of fishing modes.

While a preferred embodiment of the invention has been described using specific terms, such description is for illustrative purposes only, and it is to be understood that changes and variations may be made without departing from the spirit and scope of the following claims.

What is claimed is:
1. A broken bill fishing plug comprising:
(a) a plug body;
(b) a lateral slot formed in a forward end of the plug body extending about a substantial portion of the forward end of the plug body;
(c) a separate bill carried by the forward end of the plug body;
(d) a shank portion of the bill being received in said slot opening for lateral pivoting of said bill and plug body relative to each other;
(e) pivot means attaching said bill to said plug body
(f) said lateral slot having a lateral extent permitting lateral movements of said shank portion on opposing sides of a center line of said plug body within said slot; and
(g) eyelet carried by said fishing bill for attachment to a fishing line in a manner that weight of the bill allows the plug body to be delivered to increase depths with a wobbling action.

2. The device of claim 1 including a stop means carried in said lateral slot for limiting the relative lateral movement between said bill and plug body.

3. The device of claim 2, wherein said stop means is removable so that said fishing plug retrieves in generally side-to-side diversions when said stop means is removed and retrieves in generally side to side diversions when said stop means is inserted in which the amplitude of said side-to-side diversions is less than when said stop means is removed.

4. The device of claim 1, wherein said broken bill is attached to said plug body by means of a lateral pivot which allows said bill to pivot only laterally about said pivot.

5. The device of claim 1, wherein said pivot means includes a lateral pivot causing said fishing plug to move in alternating side directions on opposite sides of a generally straight path of travel.

6. The device of claim 1, wherein said pivot means includes a loose omnidirectional pivot which includes a vertical pivot pin carried by said plug body and said broken bill includes an opening having a diameter larger than the diameter of the pivot pin to the extent that said plug body and bill may move in all directions relative to each other.

7. The device of claim 1 including means for adjusting the amount of weight which is carried by said bill.

8. A broken bill fishing plug comprising:
(a) an elongated fishing plug body;
(b) a spoon bill carried by said fishing plug body;
(c) a pivot means connecting said spoon bill to said fishing plug body producing relative lateral movements of said spoon bill and plug body in a manner that said fishing plug darts in a side-to-side path with alternating lateral diversions when said fishing plug is retrieved through the water; and
(d) a removable stop means carried by said fishing plug body for limiting said lateral movement when carried by said fishing plug body causing said fishing plug body to dart from side to side in lateral side diversions during retrieval, and said fishing plug darting from side to side during retrieval with side diversions of greater amplitude when said stop means is removed from said fishing plug body.

9. The device of claim 8, wherein said fishing plug retrieves in a generally straight line between alternate ones of said side-to-side diversions.

10. A fishing plug comprising:
(a) a plug body;
(b) a lateral slot formed in a forward end of the plug body extending about a substantial portion of the forward end of the plug body;
(c) a separated bill carried by the forward end of the plug body;

(d) a loose omnidirectional pivot attaching said bill to said plug body;

(e) a shank portion of the bill being received in said slot opening and having a height less than the height of the slot opening to provide a gap between said shank portion and the opposing surfaces of the slot opening for loose omnidirectional pivoting of said bill and plug body relative to each other;

(f) said lateral slot having a lateral extent permitting lateral movements of said shank portion on opposing sides of a center line of said plug body within said slot; and (g) an eyelet carried by said fishing bill for attachment to a fishing line in a manner that weight of the fishing bill allows the fishing body to be delivered to increased depths while the wobbling action of the fishing body is not reduced.

11. The device of claim 10, wherein said loose pivot includes a vertical pivot pin carried by said plug body and said broken bill includes an opening having a diameter larger than the diameter of the pivot pin.

12. A deep diving fishing plug which exhibits natural wobbling actions of a bait fish comprising:
   (a) a fish plug body;
   (b) a lateral slot formed in a forward end of said fish plug body;
   (c) a broken bill attached to said plug body having a weighted bill spoon; and
   (d) omnidirectional pivot means attaching said broken bill to said plug body for allowing said fishing bill and plug body to move generally in an omnidirectional pattern which includes vertical and lateral movements relative to each other.

13. The device of claim 12, wherein said weighted spoon bill includes means for adjusting the amount of weight which is carried by said spoon bill.

14. The device of claim 13, wherein said omnidirectional pivot means connects said spoon bill to said fishing plug body in a manner that said spoon bill may be weighted for diving in a range of 20 to 40 feet and produces a generally omnidirectional wobbling action of said fishing plug body relative to said open spoon bill during retrieval.

15. The device of claim 13, wherein said omnidirectional pivot means connects said spoon bill to said fishing plug body in a manner that said spoon bill may be weighted for diving in a range of 20 to 40 feet and produces a generally omnidirectional wobbling action of said fishing plug body relative to said spoon bill during retrieval.

16. The device of claim 12 wherein said bill includes a shank having a height less than said lateral slot facilitating relative pivotal movements between said bill and plug body in all directions.

* * * * *